Figure 1:
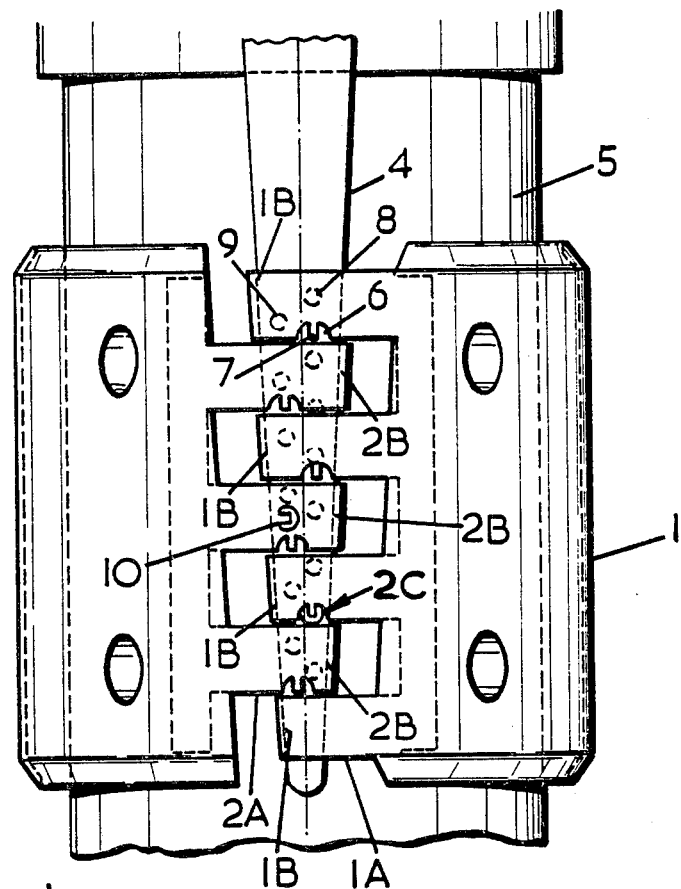

United States Patent [19]

Speirs

[11] 4,412,370
[45] Nov. 1, 1983

[54] CLAMPS

[76] Inventor: Graeme K. Speirs, Redridge Cottage, Den of Cults, Aberdeen, Scotland

[21] Appl. No.: 390,368

[22] Filed: Jun. 21, 1982

[30] Foreign Application Priority Data

Jun. 19, 1981 [GB] United Kingdom ............... 8118901

[51] Int. Cl.³ ............................................. B65D 63/08
[52] U.S. Cl. ........................................ 24/268; 24/25; 24/249 R
[58] Field of Search ............... 24/268, 25, 264, 20 W, 24/201 LP, 251, 249 R, 260, 257, 327, 214, 211 R, 255 SL; 285/255, 339-343; 248/68 R, 74 R; 292/248, 249, 342

[56] References Cited

U.S. PATENT DOCUMENTS

| 565,698 | 8/1896 | Sparks | 24/268 |
| 1,452,515 | 4/1923 | Kearney et al. | 292/342 |
| 3,002,241 | 10/1961 | Scarlock | 24/251 |
| 3,376,056 | 4/1968 | Linstead | 24/268 |
| 3,757,387 | 9/1973 | Bush et al. | 24/268 |
| 3,916,507 | 11/1975 | McGrath | 24/268 |
| 4,189,810 | 2/1980 | Beziat | 24/249 R |
| 4,340,996 | 7/1982 | Stance | 24/255 SL |

FOREIGN PATENT DOCUMENTS 538621 6/1922 France ........................... 24/201 LP Primary Examiner—Gene Mancene
Assistant Examiner—John Weiss
Attorney, Agent, or Firm—Larson and Taylor

[57] ABSTRACT

The clamp of the invention comprises two arcuate portions hinged to one another and formed with looped fingers which interlace when the clamp is closed whereupon the looped ends of the interlaced fingers define between them a tapered passage which receives a tapered pin. The pin is formed with holes distributed along the pin and at least one of the interlacing fingers is formed with a tab which is deformable to project into and engage one of the holes in the pin.

3 Claims, 2 Drawing Figures

CLAMPS

The subject of this invention is a clamp particularly of the type intended to fit around a cylindrical object such as a drill pipe or the production tubing of gas or an oil well, particularly for the purpose of supporting the control lines which normally lie alongside the production tubing.

Because of variations in the external diameter of such pipelines resulting from manufacturing tolerances and also to permit the control lines to be clamped securely it is necessary that a clamp made for a specific diameter of pipeline must be capable of providing a degree of adjustment i.e. its peripheral dimension must be adjustable. One known method of providing for this adjustment is to form the clamp of two arcuate portions each hinged to the other along one edge, the other edges of the clamp portions being formed with fingers which interlace when the clamp is closed, each finger having its outer end curled to form a passage, the arrangement being that when the clamp is closed around the pipe and the fingers interlace with one another the passages in the interlaced fingers lie end to end to form a continuous passage through which a tapered pin may be inserted, the passages formed in the individual fingers being so shaped that when the fingers are interlaced the width dimension of the passage as defined by successive fingers is a reducing width from one end of the clamp to the other although the width of the passage in each finger is greater than the defined width of the passage so that the tapered pin forced into the passage will cause the clamp elements to be pulled towards one another whereby to reduce the overall peripheral dimension of the clamp and cause it to contract on the pipe. The difficulty heretofore has been to lock the pin in some way which will prevent the pin from working loose yet which allows the pin to be locked in almost any chosen position without introducing mechanical complication always bearing in mind that such a clamp is used in extreme conditions of dirt, sand, water and oil.

It is an object of the present invention to provide a clamp as described fitted with a pin which can be positively anchored in place yet having a construction of extreme simplicity.

A clamp according to the invention comprises two arcuate portions each hinged to the other along one edge, the other edges of the clamp portions being formed with fingers which interlace when the clamp is closed, each finger having its tip portion bent back on itself to form a flat loop, the looped ends of the individual fingers being so dimensioned that when the fingers are interlaced the looped ends define between them a passage which tapers from one end of the clamp to the other, at least one finger being formed on the outer face of the looped portion with a tab which is deformable to project into the passage and a tapered pin formed with at least one set of holes longitudinally disposed along the pin in a position such that when the pin in inserted into the passage the holes pass successively across the position of the tab formed on the finger.

Each finger or several selected fingers of one clamp portion may be formed with a tab, the holes in the tapered pin being so arranged that they come opposite successive tabs as the pin moves through the passage and the spacing of the tabs and the spacing of the holes being such that the spacing between adjacent tabs is not a whole number multiple of the spacing between adjacent holes in the pin.

The fingers of both clamp portions may be formed with deformable tabs, the pin being formed with two rows of holes each row being parallel to the adjacent edge of the pin. This construction not only provides a greater degree of adjustability in the pin but also makes it unnecessary to insert the pin with a particular face outwards.

Figure 2:
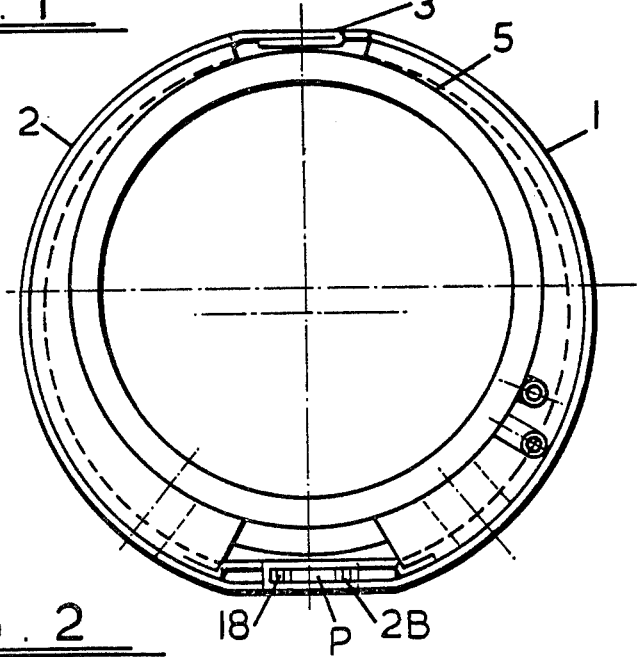

A practical embodiment of the invention is illustrated in the accompanying drawings in which FIG. 1 is a view looking on a clamp showing the fingers of the two clamp portions interlaced with one another and a pin in place holding the clamp closed and FIG. 2 is a view looking on one end of the clamp showing how it embraces a pipe and showing the passage for reception of the pin but without the pin in place.

In the drawings 1 and 2 denote arcuate clamp sections hinged to one another at 3, the clamp section 1 being formed with fingers 1A and the clamp section 2 being formed with fingers 2A, each finger presenting a passage P formed by bending the material of which the clamp portion is made into a flat loop as can be seen clearly in FIG. 2. The passages formed by the fingers are so shaped that the end walls 1B, 2B etc of the loops of successive fingers 1A, 2A define a passage P of reducing width from one end of the clamp to the other. 4 denotes a tapered pin inserted through the tapered passage P, the clamp portions being drawn towards one another by forcing the pin further through the passage, thus causing the end walls 1B presented by the fingers 1A of the clamp portion 1 to be moved towards the clamp portion 2 while the end walls 2B of the fingers 2A of the clamp portion 2 are moved towards the clamp portion 1 this reducing the peripheral dimension of the clamp and tightening it on the pipe 5 which it surrounds. For the purposes of locking the pin the fingers 1A and 2A are cut away at 6 so that a tab 7 is presented between each pair of cut-away portions 6. The pin 4 is formed with rows of holes 8 and 9. In the action of driving the pin through the passage P the holes 8 pass successively across the tabs 7 in the fingers 1A and the holes 9 pass successively across the tabs 7 in the fingers 2A. Because of the irregular spacing of the holes 8 and 9 with respect to the spacing of the adjacent tabs in the fingers 1A and in the fingers 2A only one tab is opposite a hole at one time so that each small forward increment of movement of the pin 4 a hole 8 or 9 will be brought opposite one of the tabs 7. When the clamp has been tightened to the desired extent whatever tab is opposite a hole in the pin 4 is bent inwardly as at 2C so that the tip of the tab enters the hole. This locks the pin 4 in place and prevents it from being withdrawn. By forming tabs in the fingers of both clamp sections and by providing two rows of holes in the pin 4 not only is the increment of forward movement required to bring a hole into engagement with a tab reduced from the construction in which tabs are formed only in the fingers of one clamp portion with one row of holes in the pin but no matter which way the pin is inserted there will be holes coming opposite tabs whereas with a single row of holes and tabs and an incorrectly inserted pin it may be that there will be no position in which a tab was opposite a hole. There may, of course, be occasions where that would be unimportant and the degree of adjustment provided by a single row of holes and tabs would be sufficient. It will be appreciated, of course, that the fingers may be formed with for example the walls 1B or the walls 2B parallel to the axis of the clamp, the walls 2B or the walls 1B only forming a tapered passage. In this case one edge of the pin is parallel to the axis of the clamp. The construction illustrated is, however, a good construction for general purposes. The tabs may take various forms one of which by way of example is illustrated at 10 and the holes in the pin may be circular or non-circular and may pierce the pin completely or may be blind holes.

What is claimed is:

1. A clamp which comprises two arcuate portions each hinged to the other along one edge, the other edges of the clamp portions being formed with fingers which interlace when the clamp is closed, each finger having its tip portion bent back on itself to form a flat loop, the looped ends of the individual fingers being so dimensioned that when the fingers are interlaced the looped ends define between them a passage which tapers from one end of the clamp to the other, at least one finger being formed on the outer face of the looped portion with which a tab which is deformable to project into the passage and a tapered pin formed with at least one set of holes longitudinally disposed along the pin in a position such that when the pin is inserted into the passage the holes pass successively across the position of the tab formed on the finger.

2. A clamp as claimed in claim 1 in which several fingers of one clamp portion are formed each with a tab, the holes in the tapered pin being so arranged that they come opposite successive tabs as the pin moves through the passage and the spacing of the tabs and the spacing of the holes being such that the spacing between adjacent tabs is not a whole number multiple of the spacing between adjacent holes in the pin.

3. A clamp as claimed in claim 1 in which several fingers of both clamp portions are formed with deformable tabs, the pin being formed with two rows of holes each row being parallel to the adjacent edge of the pin.

* * * * *